A. LARSEN.
ROTARY KILN.
APPLICATION FILED MAY 12, 1920.
1,358,760.
Patented Nov. 16, 1920.
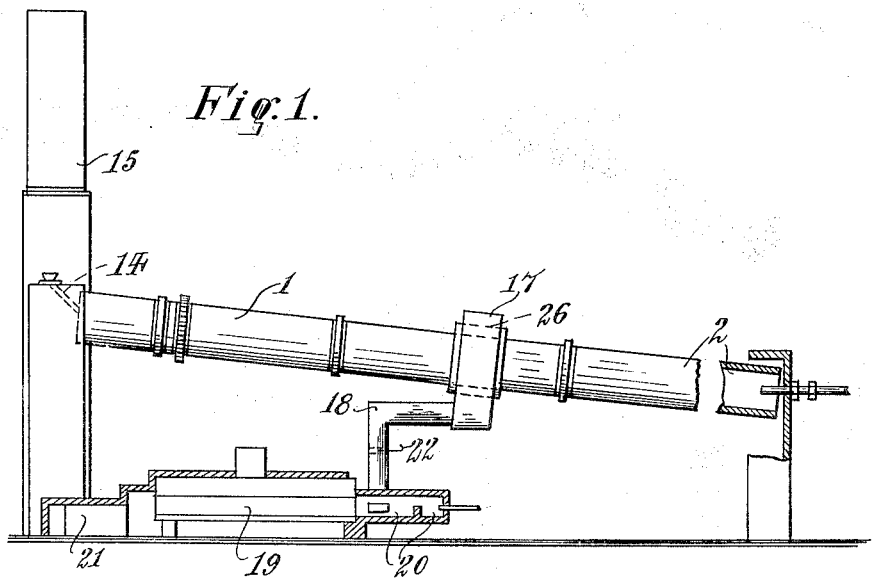
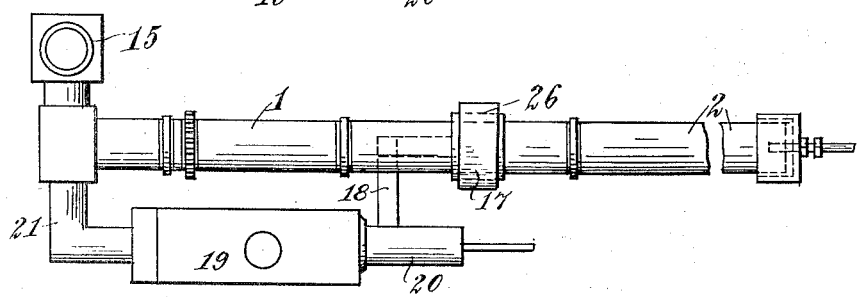
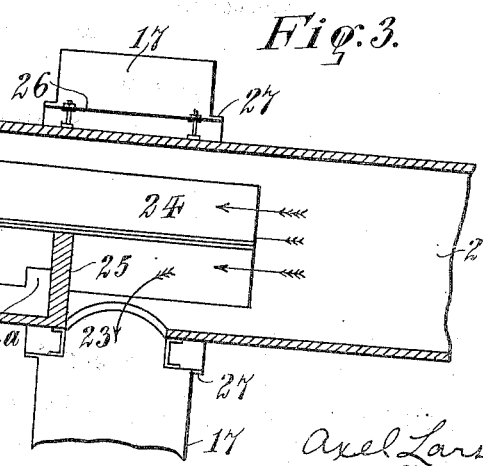
WITNESS
INVENTOR
Axel Larsen
BY
Redding & Greeley
ATTORNEYS

UNITED STATES PATENT OFFICE.

AXEL LARSEN, OF AALBORG, DENMARK, ASSIGNOR TO F. L. SMIDTH & CO., OF NEW YORK, N. Y., A CORPORATION OF NEW JERSEY.

ROTARY KILN.

1,358,760.

Specification of Letters Patent.   Patented Nov. 16, 1920.

Application filed May 12, 1920.  Serial No. 380,854.

*To all whom it may concern:*

Be it known that I, AXEL LARSEN, a subject of the King of Denmark, residing in Aalborg, Denmark, have invented certain new and useful Improvements in Rotary Kilns, of which the following is a specification, reference being had to the accompanying drawings, forming a part hereof.

In another application for Letters Patent of the United States filed concurrently herewith there are shown and described certain improvements in the construction of rotary kilns for the burning of watery material, such as cement slurry, whereby an economy in operation is effected through provision for the utilization of the surplus heat from the sintering zone or that portion of such a kiln where the carbonic acid is driven off, the hot gases or products of combustion being taken from the kiln at the upper end of the sintering zone or that portion where the carbonic acid is driven off and led away to do useful work before their return to the upper portion of the kiln or to the stack. In the constructions shown in that application the kiln is arranged in two separate portions, with an interposed chamber with which both portions communicate and from which the surplus hot gases are conducted away, means being provided for transferring the dried raw meal from the upper portion, or that portion where the carbonic acid is driven off, of the kiln to the lower or sintering portion. The present invention has also the same general purpose and the further purpose to provide means whereby the kiln may be continuous from the end at which the liquid slurry is fed in to the end at which the clinker is discharged, so that the passage of the cement material from one portion of the kiln to the other can be continuous and effected without the intervention of transferring devices, while the surplus hot gases at the upper end of the sintering zone or that portion where the carbonic acid is driven off of the kiln can be withdrawn to serve some useful purpose. The invention will be more fully explained hereinafter with reference to the accompanying drawings in which it is illustrated and in which—

Figure 1 is a view in elevation, partly in section and in outline, illustrating a kiln constructed in accordance with the present invention.

Fig. 2 is a top view of the same.

Fig. 3 is a detail view showing features of construction to be referred to.

The kiln shown in the drawing is continuous from its upper end, at which the slurry is fed in, to the lower end, at which the clinker is discharged, the evaporating of the water of the slurry and the drying of the raw meal being carried on as usual in the upper portion 1, while the sintering of the raw meal is carried on in the lower portion 2. The upper end of the kiln receives the slurry through a feed chute 14 and communicates with the stack 15. At its lower end the kiln receives the fuel and discharges the clinker in the usual manner. In this instance the kiln is provided in its upper portion with the cross ribs 24 which are often employed for the purpose of lifting and agitating the slurry and raw meal during the processes of evaporating and heating, such cross ribs or plates rotating with the shell, and at a point slightly above the lower end of the ribs or plates 24 the shell is provided with one or more openings 23. One such opening, registering with one of the longitudinal chambers formed by the cross, may be sufficient, and if two openings are desired they are arranged to register with alternate longitudinal chambers formed by the cross. Each longitudinal chamber or passage, formed by the cross, which registers with an opening 23 through the shell, is completely closed by a transverse wall 25, an opening being formed, as at 25ª, through one of the plates of the cross 24 into the adjacent longitudinal chamber, with which no. opening 23 registers. Surrounding the shell of the kiln, at a suitable distance therefrom, so as to form an annular chamber, secured thereto so as to rotate therewith, is a casing 26. The annular chamber thus formed is in communication with the interior of the kiln and also with the stationary chamber 17 which surrounds the casing 26 and may be flanged as at 27 to fit closely. This chamber 17 is connected by a conduit 18 with the heating chamber 19 of the boiler or other plant in which the surplus heat is made to do useful work, which boiler or other plant may also be provided with an auxiliary furnace or heating means, as at 20. The products of combustion are conducted by a conduit 21 to the stack 15. A damper 22, in the conduit 18, serves to control the passage of products of combustion from the heating chamber 17 to the heating chamber 19 and thence to the stack.

It will be observed that the hot gases or products of combustion from the sintering portion of the kiln and that portion where the carbonic acid is driven off pass from the kiln through the opening or openings 23 into the chamber 17, in volume determined by the damper 22, while the dried raw meal from the upper portion of the kiln in its continued passage through the kiln, is prevented by the cross 24 from escaping through the opening or openings 23.

It will be understood that by the construction shown and described the hot gases or products of combustion from the sintering portion of the kiln, or some portion thereof, still at a high temperature, are made to perform useful work in their passage through the boiler plant in which they may be mingled with the products of combustion from the auxiliary furnace or heating means and may then be discharged into the stack. A marked economy in the operation of the kiln is thus effected through the utilization of the surplus heat from the sintering portion of the kiln, which would otherwise be wasted.

It will be understood that various changes in details of construction and arrangement may be made to suit different conditions of use and that the invention is not restricted to the precise construction shown and described herein except as indicated in the claims.

I claim as my invention:

1. In a rotary kiln, the combination of a continuous rotatable shell having an opening therethrough, a casing surrounding the shell in line with such opening, a heating chamber, means to conduct the products of combustion delivered to said casing through the opening in the shell from the casing to the heating chamber, and means to conduct the raw material within the shell from a point above to a point below the opening through the shell.

2. In a rotary kiln, the combination of a continuous rotatable shell having an opening therethrough, a cross in said shell continued from a point above to a point below said opening and forming longitudinal passages, a transverse wall closing one of said longitudinal passages in line with the opening through the shell, said longitudinal passage communicating with the adjacent passage through an opening formed in the cross, a casing surrounding the shell in line with the opening through the shell, a heating chamber, and means to conduct the products of combustion delivered to said casing through the opening in the shell from the casing to the heating chamber.

This specification signed this 15th day of April, A. D. 1920.

AXEL LARSEN.

Witnesses as to signature:
P. O. KEMP,
K. BIRCH.